United States Patent [19]
Farros et al.

[11] Patent Number: 5,930,810
[45] Date of Patent: *Jul. 27, 1999

[54] PRINTING SYSTEM WITH PRE-DEFINED USER MODIFIABLE FORMS AND LOCAL AND REMOTE PRINTING

[75] Inventors: Royal P. Farros, Menlo Park; James A. Schuyler, San Francisco; Gaylon W. Babcock, El Granada, all of Calif.; Michael J. Finn, White Bear Lake, Minn.; Michael N. Sax, Shroeview, Minn.; Alan D. Johnson, New Brighton, Minn.

[73] Assignee: Taylor Corporation, North Mankato, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/512,983

[22] Filed: Aug. 9, 1995

[51] Int. Cl.$^6$ .................................................. G06F 17/00
[52] U.S. Cl. ........................ 707/506; 707/508; 707/517; 707/527; 364/479.05; 235/381
[58] Field of Search ..................................... 395/766, 961, 395/962, 226, 227, 326, 339, 352, 353, 354, 788, 789; 364/479.01, 479.02, 479.03, 479.04, 479.05; 358/527; 345/326, 339, 352, 353, 354; 707/517, 506, 527; 235/381

[56] References Cited

U.S. PATENT DOCUMENTS

| | | | |
|---|---|---|---|
| 4,508,156 | 4/1985 | Banks et al. | 164/35 |
| 4,839,829 | 6/1989 | Freedman | 395/329 |
| 5,029,099 | 7/1991 | Goodman | 364/479.05 |
| 5,036,472 | 7/1991 | Buckley et al. | 364/479.03 |
| 5,038,293 | 8/1991 | Goodman | 364/479.03 |
| 5,056,029 | 10/1991 | Cannon | 364/479.03 |
| 5,132,915 | 7/1992 | Goodman | 364/479.03 |
| 5,235,519 | 8/1993 | Miura | 364/479.03 |
| 5,241,464 | 8/1993 | Greulich et al. | 705/26 |
| 5,272,549 | 12/1993 | McDonald | 358/527 |
| 5,327,265 | 7/1994 | McDonald | 358/527 |
| 5,349,534 | 9/1994 | Rousseff et al. | 364/479.05 |
| 5,487,010 | 1/1996 | Drake et al. | 364/479.03 |
| 5,513,116 | 4/1996 | Buckley et al. | 364/479.03 |
| 5,513,117 | 4/1996 | Small | 364/479.03 |
| 5,550,746 | 8/1996 | Jacobs | 364/479.01 |
| 5,552,994 | 9/1996 | Cannon et al. | 364/479.03 |
| 5,555,496 | 9/1996 | Tackbary et al. | 395/227 |
| 5,559,714 | 9/1996 | Banks et al. | 364/479.03 |
| 5,561,604 | 10/1996 | Buckley et al. | 364/479.05 |

OTHER PUBLICATIONS

"Microsoft PowerPoint: Using Microsoft PowerPoint and Genigraphics© Presentation Services", Microsoft Corporation 1990–1992.

Microsoft PowerPoint Handbook, by Microsoft Corporation, 1992. (Cover pages, Table of Contents, Chs. 1,2,4,5, 13).

*Primary Examiner*—Joseph H. Feild
*Attorney, Agent, or Firm*—Merchant, Gould, Smith, Edell, Welter & Schmidt, P.A.

[57] ABSTRACT

A printing system operates on a computer system to enable creation of a variety of printed products. The printing system takes either a kiosk form or a personal system form. The printing system contains a variety of definitions of products in its storage which may be selected and modified by a user. The user may alter a plurality of aspects of the selected product including the layout of the product, the graphics of the product and different aspects of the textual information to be printed on the product to personalize the product. Upon completion of personalization of the product, the printing system provides the user with a plurality of order and transmission options which allow certain products to be printed locally, and which allows certain products to be printed by a remotely located printing facility. The user may create a print order which is transmitted in one of two manners to the remote printing facility. Payment information including credit card information may also be entered for payment of products printed by the remote printing facility.

2 Claims, 11 Drawing Sheets

Microfiche Appendix Included
(45 Microfiche, 2203 Pages)

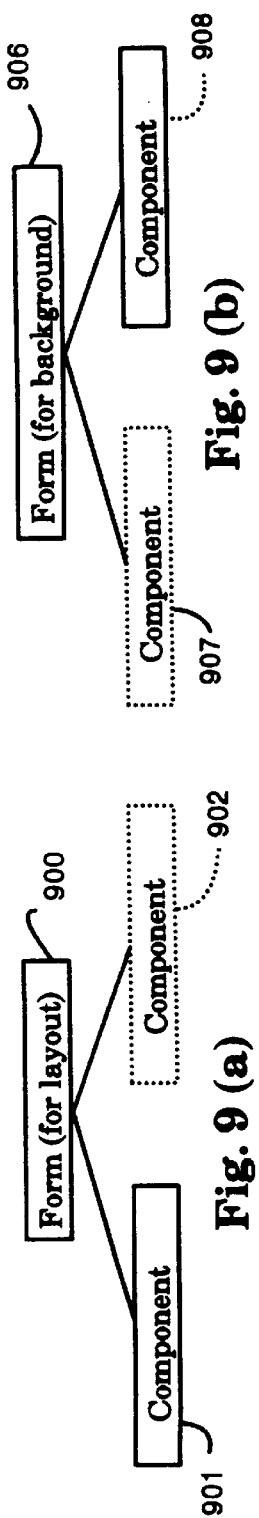
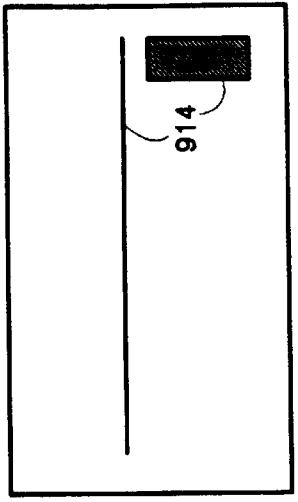
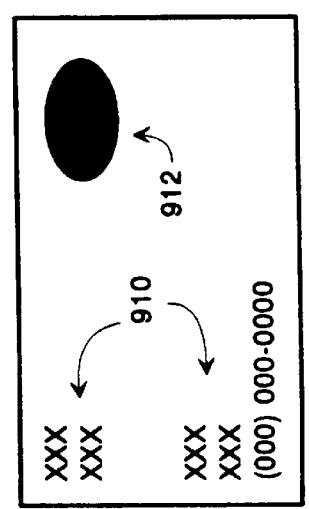
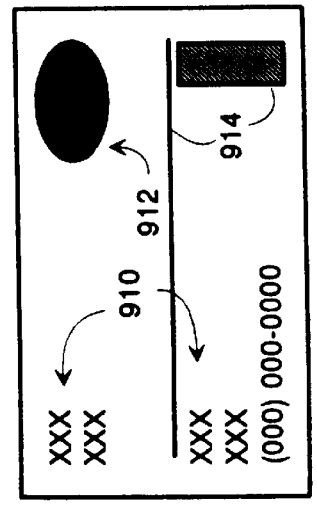
Fig. 9 (a)
Fig. 9 (b)
Fig. 9 (c)
Fig. 9 (d)
Fig. 9 (e)

PRINTING SYSTEM WITH PRE-DEFINED USER MODIFIABLE FORMS AND LOCAL AND REMOTE PRINTING

AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

MICROFICHE APPENDIX

This specification includes a microfiche appendix which consists of forty-five (45) sheets of microfiche each of which contain forty-nine (49) frames.

1. Field of the Invention

This invention relates generally to electronic data processing and more particularly, though in its broader aspects not limited to, methods and apparatus for facilitating the printing of computer generated documents.

2. Background of the Invention

A variety of software applications are available which allow the creation of several types of printed documents such as business and greeting cards, stationary and slides. Some applications allow the printing of such documents on a conventional printer such as typically found in a home or office environment. Typically, such printing is accomplished by feeding specialized printable media which have the necessary size and structural characteristics to be fed through the paper feed mechanism of a printer. For certain types of printable media, the requirements of the paper feed mechanism require compromises in the quality of the printable media to allow the convenience of local printing. For example, when printing onto sheets containing cards such as index or business cards, which may be separated by means of perforated edges formed into the sheets, the thickness of the paper and the smoothness of the edges of the cards must be sacrificed to enable the sheets to be fed through the paper feed mechanism of the local printer.

If printing of a higher quality than is available on a home or office printer is desired, or if large volumes of a printed document are desired, or if printable media which is beyond the limited capabilities of a home or office printer are desired then the services of a printing facility must be utilized. Often such facilities contain a variety of specialized printing machinery to print large volumes of printed products onto a variety of different printable media, including plain paper, preprinted paper, business cards, and stationary. In addition, such printing facilities may contain the capability to print onto physical objects such as cloth shirts, caps and coffee mugs.

While application programs as mentioned above exist which enable the creation of printable documents, such programs exhibit several shortcomings. First, many of such applications are devoted to the creation of documents for only a limited type of printable media. For instance, some applications may allow the creation of stationary, while other applications allow the creation of business cards, while yet other applications allow the creation of overhead projection slides.

Second, many of such application programs allow for the local printing of documents but lack the mechanisms to allow the electronic transfer of the documents to the necessary printing facility. With such programs, the transfer of the information necessary for the printing of the document needs to be done either by storing the document to a transportable data storage media such as a floppy magnetic diskette, or by printing the document onto paper by use of a local printer and having the information re-entered and formatted in a system at the printing facility. Other programs allow for the electronic transfer of documents to a printing facility but are limited in the types of documents which may be created and transmitted. While such programs may enable the creation and transmission of one type of document, such as stationary, they are incapable of the creation and transmission of another type of document.

It is accordingly an object of the present invention to provide a printing system which facilitates the creation of a variety of types of documents and the printing of certain documents locally or at a remote printing facility.

SUMMARY OF THE INVENTION

In a principle aspect, the present invention takes the form of a printing system which provides for the creation of a variety of types of documents and the printing of the documents at a local printer and/or at a remotely located printing facility. A plurality of predefined forms are provided to facilitate the creation of documents. The predefined forms may be retrieved, modified and stored for subsequent retrieval and modification. Once a predefined form has been modified, it may be printed at a local printer, or may be electronically transmitted to a remotely located printing facility for high quality and high volume printing of the document onto a variety of high quality printable media to create a printed product. The printed product may take the form of a business card, an announcement or greeting card. The product may also be a physical object such as embroidered or silkscreened shirts, baseball caps, personalized plaques, and trophies. The types of printed products which may be created is limited only by the predefined forms stored in the printing system. The predefined forms are created using a Form Definition Language which is sufficiently flexible to enable the definition of a variety of two and three dimensional physical objects.

The printing system may advantageously be implemented either as a program executing on a desktop type computer system as found in the home or office, or as a kiosk which is understood to be a computer system in a retail store which is configured for ease of use by customers in the retail store. In either form of implementation the printing system operates upon a data processing system which contains a long-term storage device, a visual display, one or more input devices, a local printer and a communications device. The long-term storage device contains therein a plurality of Form Definition Files (FDFs) which each define a different product. Each of the FDFs contain a hierarchical definition of different aspects of the product which may each be changed by the user to personalize the printed product. A primary module executed by the data processing system operates to provide an accurate What You See Is What You Get (WYSIWYG) display of the selected product and of the changes made by the user to changeable aspects of the selected product. The printing system provides an easy to user Graphical User Interface which includes push-buttons displayed on the visual display which may be selected by the user to navigate from one part of the printing system to another, to change the sizes of forms, change fonts, colors and other attributes of forms. Upon selection of the appropriate options to modify the selected form, the user may transmit a print order to the remote printing facility.

Alternatively, upon selection of the appropriate products, the user may print the selected and modified product using the local printer.

Embodiments incorporating the above noted features advantageously provide for the simple and fast generation of different types of printable media by those who do not have training in the area of graphical design. Laypersons, using the pre-defined forms, may create aesthetically pleasing high quality printed products and electronically place a print order with the remote printing facility. The printing system allows for final verification of the design as well as providing billing options and transmitting the billing information, shipping information as well as the design to the remote printing facility. The printing system may be easily updated with new forms to expand the number of designs which may be created.

These and other features and advantages of the present invention may be better understood by considering the following detailed description of certain preferred embodiments of the invention. In the course of this description, reference will be made to the attached drawings.

BRIEF DESCRIPTION OF THE DRAWINGS

FIGS. 9(a), 9(b), 9(c), 9(d) and 9(e) are block and schematic diagrams showing additional aspects of element 105 of FIG. 1;

Figure 1:
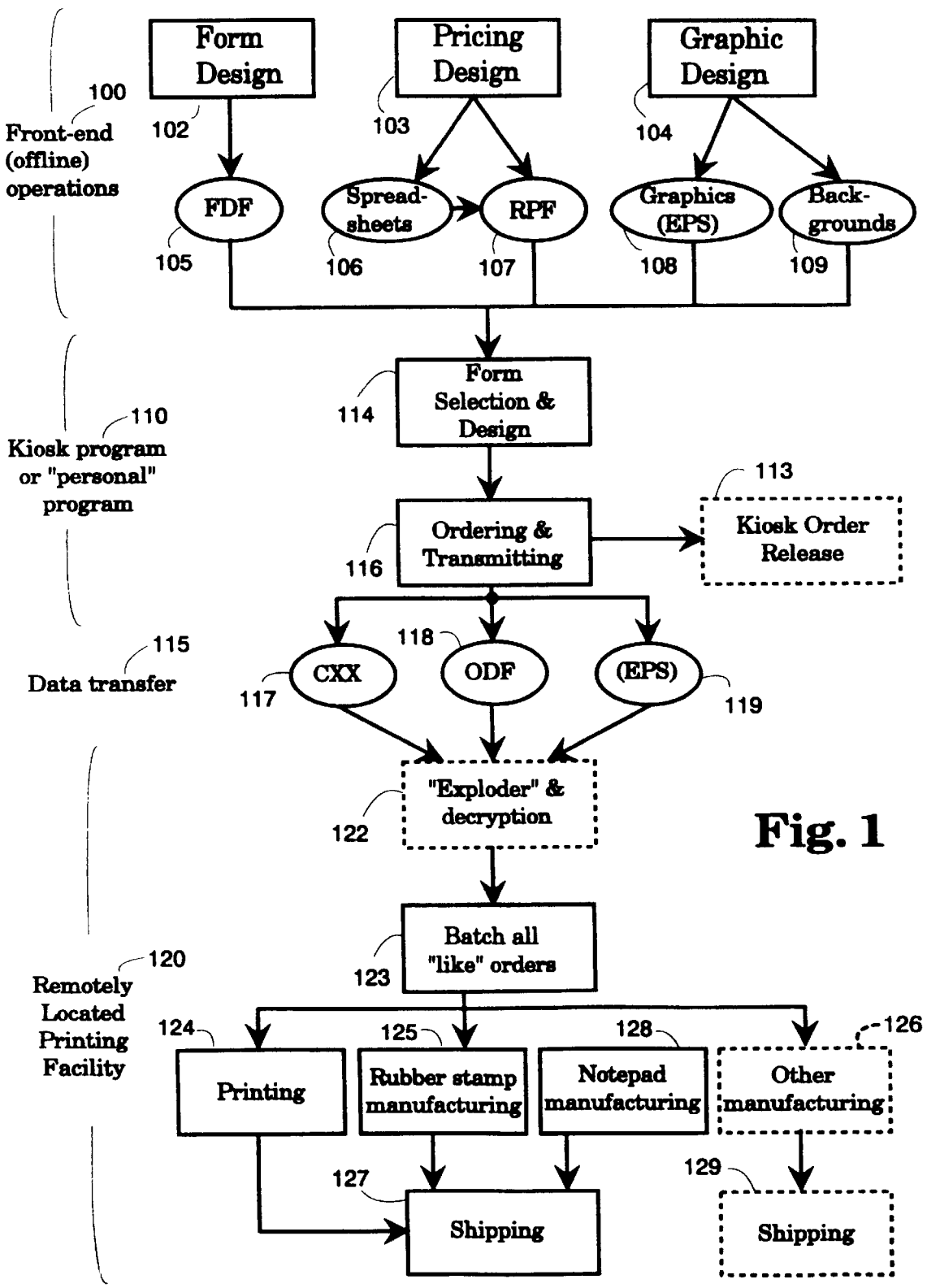
FIG. 1 of the drawings is a high-level block diagram of a preferred embodiment.

Textual information in the attached drawings shown in italic typeface identifies the routine or routines contained in the attached microfiche appendix which implement the corresponding functions and/or steps identified in the drawings.

DETAILED DESCRIPTION

I. System Overview

A. Overview of the Generation of a "Printed Product"

FIG. 1 of the drawings is a high-level block diagram of the components and steps included in the creation and printing of a printed product by a printing system which utilizes the principles of the invention. The steps include front-end operations 100, use of a printing system 110 and use of a remotely located printing facility 120. Front-end operations create computerized files seen at 105–109 which are used by printing system 110 to directly create a printed product via a local printer, or to generate a printing order for remotely located printing facility 120 which generates a printed product in accordance with the printing order.

As used herein the term "printed product" is intended to refer to any finished good created by the printing facility 120 in accordance with a printing order received from a printing system 110. The term "printable medium" as used herein, is intended to refer to any medium which may be printed upon by the printing system 110 or printing facility 120 to create a printed product. Printable media include but are not limited to: paper, labels, cloth materials such as shirts and caps, stickers and coffee mugs. The term "pre-printed" refers to a printable medium which contains textual and/or graphical images which are printed onto the medium prior to the printing of text and graphics specified by the user. The term "user" refers to an individual making use of printing system 110, and the term "customer" refers to a user who uses printing system 110 to generate a printing order. The term "printing" is intended to include other methods of placing an image onto a physical object such as silk-screening onto cloth, embossing, lithography, etc.

Front-end operations 100 are performed off-line before use of the printing system 110 by a user. As seen at 102–104, forms information, pricing information and graphic information are developed and stored to computer readable files seen at 105–109. The front-end steps advantageously simplify the generation of a printed product by the user by providing a plurality of pre-defined forms which may be selected, modified, stored and printed by the user. As will be described in further detail, the forms advantageously provide templates for the creation of a number of types of printed products regularly used in the home or office. Such forms include forms for the generation of business cards, stationery, self-adhesive note pads such as Post-It® Notes, certificates, announcements, greeting cards and postcards. Graphical designs for use in the forms are also created and stored in computer readable files seen at 108 and 109. Also generated for use in developing the printed product are background files, seen at 109 which provide the user with a visual representation of available pre-printed printable media.

The forms, pricing and graphic information are each stored in specialized computerized files as seen at 105–109. The pre-defined forms are stored in a Format Definition File (FDF) and the pricing design files are stored in spreadsheet type files and in Real-Time Pricing Files (RPF) which make use of the spreadsheet files. Graphic information is stored in Encapsulated PostScript (EPS) type files. Background files contain visual representations of available pre-printed media, in an FDF format which can be combined with FDF files containing design or layout information. Together, the FDF, RPF, and EPS files contain information for the user to fully describe the visual layout of the printed product. In addition, these files may contain links to two or three-dimensional graphic files which are to be included in the printed product. FDFs may also contain custom manufacturing information which is linked to the type of form being described. The RPFs also include information which controls the flow of the printing system's interaction with the user. The pricing information contained in the RPF is either created directly as a RPF file or it may be created using a spreadsheet program which generates a matrix which is read by the printing system.

Files 105–109 are used by printing system 110 to implement the second stage of the generation of the printed product. A user who wishes to create a printed product makes use of printing system 110 which is programmed to utilize files 105–109. The printing system advantageously takes one of two forms. The first form, referred to herein as a "kiosk" is described in firther detail in the description accompanying FIG. 2. The second form, referred to herein as a "personal system" is described in further detail in the description accompanying FIG. 3. As used herein the term "printing system" refers to the kiosk and personal system collectively. With either the kiosk or the personal system, the user, as seen at 114, designs a printed product by selecting from among the forms supported by the FDF. Graphics and Backgrounds are utilized to the extent desired and pricing information is provided by the printing system to allow the user to make an informed decision as to the exact printed product desired. Once the printed product has been specified by the user, the printing system is utilized, at step 116, to either print the printed product at a local printer or to create a print order for Remote Printing Facility 120. Transfer of the print order is accomplished using several types of electronic files. CXX files, as seen at 117, contain primarily the physical description of the printed products ordered by the customer. Included among the information in the CXX files is customer and product information, including the entire form design for each form used in the printed product (s) created by the user, along with all personalized data for each of the printed product(s). Order Data Files (ODF), as seen at 118, contain quantity and pricing information, user name and address, and credit card and other related information. Encapsulated PostScript (EPS) files contain the information required for use by imagesetting equipment at the printing facility to print the print order onto the specified printable medium. All files transmitted from the kiosk or personal system to the remotely located printing facility are advantageously encrypted and compressed, providing privacy (security) and reducing the required transmission time. An order release mechanism 113 is utilized in the kiosk to allow the transmission of a print order after payment has been made for the order.

Upon receipt of files 117–119, a production system located at the printing facility decrypts and expands the received files to the extent necessary and controls the routing, printing and shipping of the received order, as well as the necessary billing, including obtaining credit card authorization. Alternatively, the credit card authorization may be performed by the personal system or kiosk by dialing a credit card authorization facility directly. As seen at 123, batch type processing is utilized for like orders for greater efficiency. As seen at blocks 124–126, the printing facility advantageously contains equipment to print onto each of the types of printable media supported by the FDFs, such as multiple types of paper (124), rubber stamps (125), notepads 128 and the other types of printable media (126) supported by FDFs 105. Finally, the printed product is shipped to the user upon completion of printing to fulfill the print order.

B. The Printing System

As noted above, the printing system 110 may take one of two forms. Each of these forms is described separately below.

1. The Kiosk

Figure 2:
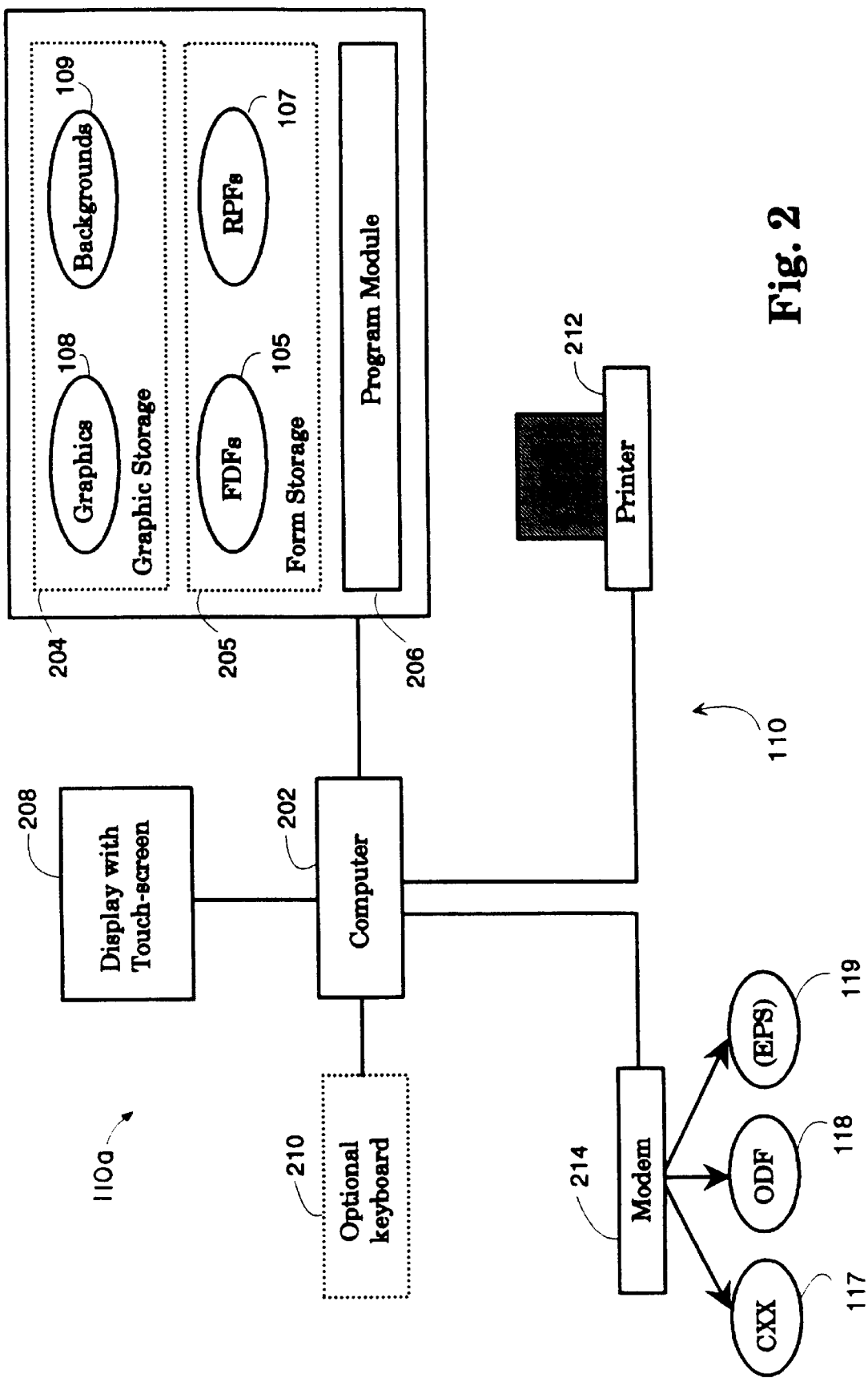
FIGS. 2, 3 and 4 are block diagrams of alternative embodiments showing a portion of a preferred printing system.

FIG. 2 of the drawings is a high level block diagram of printing system 110a in kiosk form. The kiosk 110a interacts with a user in a point-of-sale type computer system which may typically be found in a retail store. Computer 202 is preferably a standard IBM-PC compatible computer system running the Windows™3.1, Windows95™ or IBM OS/2™ Operating System. Alternatively, computer 202 may take the form of an Apple Macintosh™ system running the Macintosh Operating System. Computer 202 contains storage 204 which contains FDFs 105, RPFs 107, Graphic 104 and Background 109 type files as described above in addition to containing the executable printing system program module 206 to implement the functions of the printing system. Input to the kiosk 110a is advantageously entered via a touch sensitive display 208. A keyboard 210 may also be used for input. The touchscreen advantageously provides an easy to use interface by allowing the user to touch images of keys and buttons which appear on the display to effect the desired selections. The on-screen keyboard displayed on touch sensitive display 208 may be configured to look like a standard "QWERTY" keyboard, or in a variety of other configurations. The exact configuration of the on-screen keyboard is controlled by an FDF, and thus may be modified to fit varying needs. Printer 212 which is attached to computer 202 is utilized to (1) print a receipt detailing the costs of the print order created by the user, (2) to provide a visual representation of the printed product to be printed in accordance with the print order and (3) to print order and shipping information regarding the print order. Modem 214 operates under control of program module 206 to cause transmission of the print order in the form of CXX, ODF and EPS files 117–119 to the remote printing facility. The CXX, ODF and EPS files are retained in forms storage on the kiosk so that the user may return and place a new order based on a previously placed order.

2. The Personal System

Figure 3:
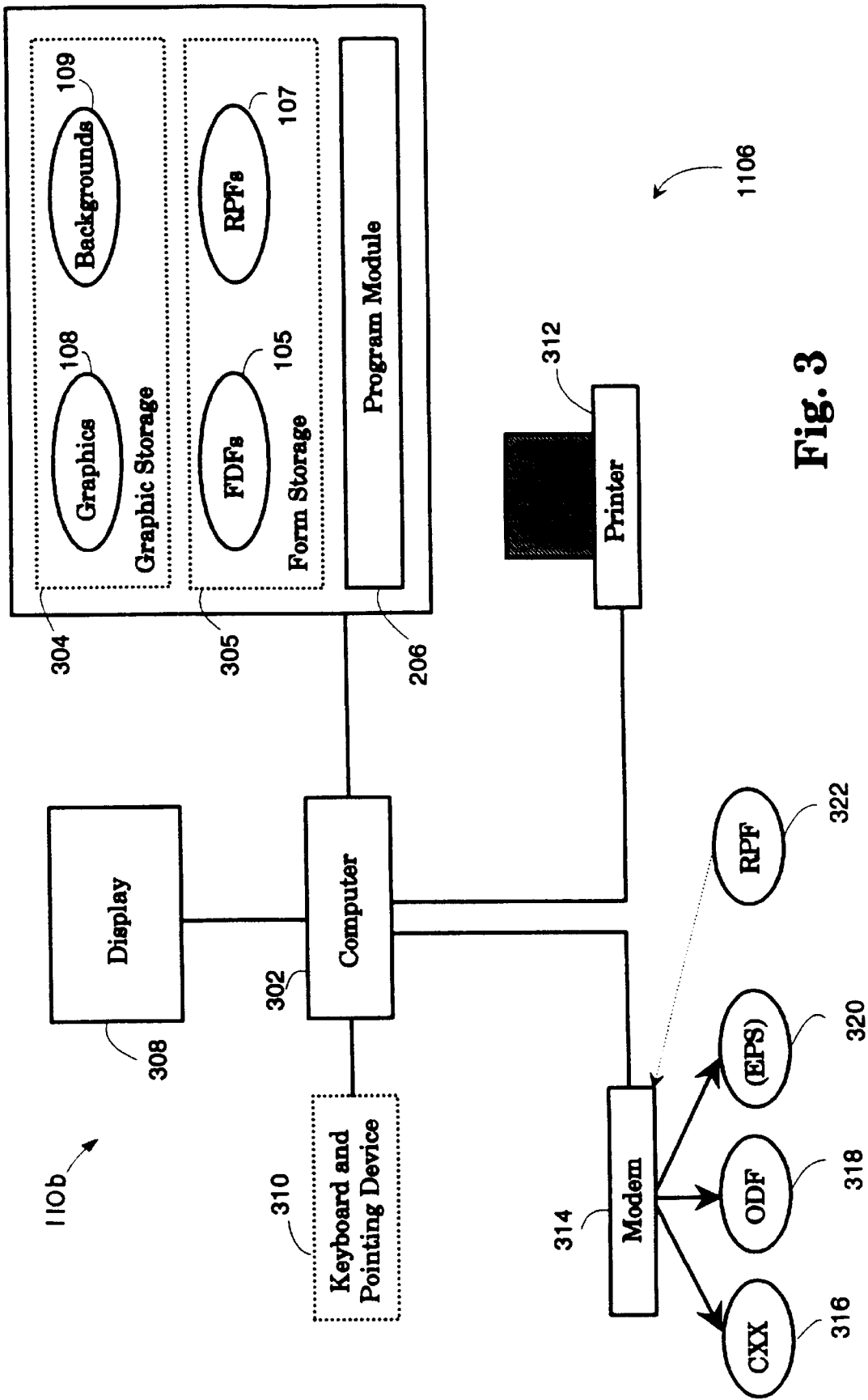

FIG. 3 of the drawings is a high level block diagram of printing system 110b in personal system form. The personal system 110b takes the form of a desktop type computer with attached peripherals as typically found in the home or office environment. Computer 302 is preferably a standard IBM-PC compatible computer system running the Windows 3.1, Windows95 or IBM OS/2 Operating System. Alternatively, computer 302 may take the form of an Apple Macintosh system running the Macintosh Operating System. Computer 302 contains storage 304 which contains FDFs 105, RPFs 107, Graphic 104 and Background 109 type files as described above in addition to containing the executable program module 206 to implement the functions of the printing system. Input to the personal system 110b is entered via a standard "QWERTY" type keyboard and pointing device such as a mouse or trackball as seen at 310. Display 308 is a conventional type display without the touch sensitive surface contained in display 208 of the kiosk. Printer 312 which is attached to computer 302 is utilized for the same functions listed above for printer 212, namely to (1) print a receipt detailing the costs of the print order created by the user, (2) to provide a visual representation of the printed product to be printed in accordance with the print order and (3) to print order and shipping information regarding the print order. In addition printer 312 provides a fourth function of printing the printed product in instances where the printable medium selected by the user may be printed upon by printer 312. Preferably such printable media include business cards contained on sheets which are laser perforated to allow for smooth edges upon separation of the cards from the sheet. Other types of printable media include perforated postcards, note cards and certificates with pre-printed borders. Some of the printable media may include pre-printed media which have numerous background designs. Background files 109 advantageously enable the display of the pre-printed media on the display 308 to provide the user with an accurate What You See Is What You Get (WYSIWYG) representation. Backgrounds are composed of FDF files without layout components, containing only components designed to render the background as it will appear after ink has been applied to the preprinted background paper. FDFs 105 also may contain printable backgrounds for certain forms. Modem 314 operates under control of program module 206 to cause transmission of the print order in the form of CXX, ODF and EPS files 316, 318 and 320 to the remote printing facility. RPFs 322 may advantageously be updated during transmission of a print order to remote printing facility 120 to enable RPFs 322 to be updated with periodic price changes.

3. Networked Personal System

Figure 4:
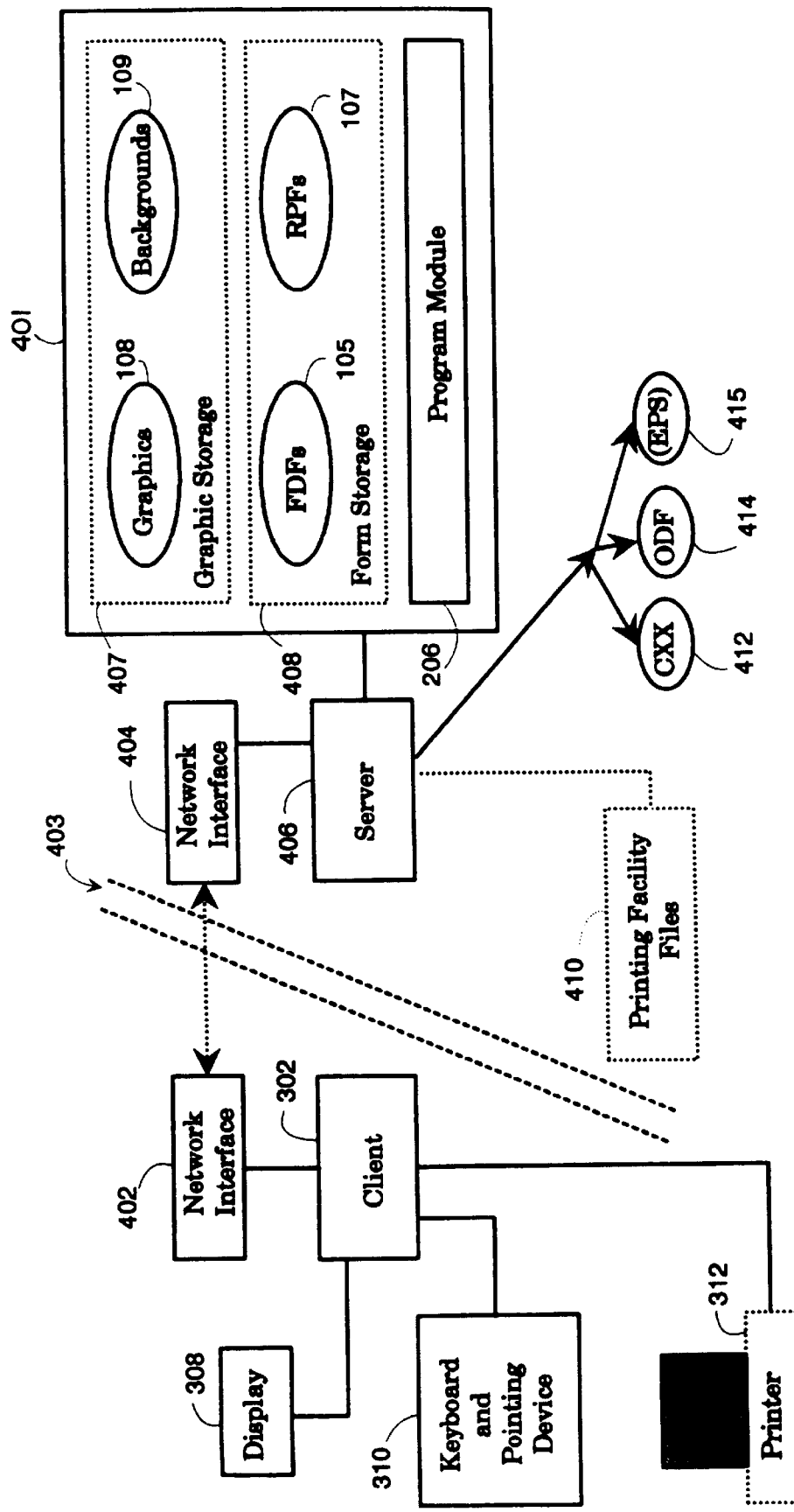

FIG. 4 of the drawings is a high level block diagram of printing system 110b as implemented in client/server form which may typically be found in an office environment, or in a distributed network such as the Internet. Client computer 302, display 308, keyboard and pointing device 310 and printer 312 may take the same form as described for those components in the description accompanying FIG. 3. Storage 401 which contains FDFs 105, RPFs 107, Graphic 108 and Background 109 type files as described above in addition to containing the executable program module 206 to implement the functions of the printing system is coupled to a server computer 406 which is coupled to client computer 302 via network interfaces 402 and 404 and network 403. Server computer 406 responds to requests by client computer 302 to provide data and code stored in storage 402. Communications network 403 connects the client computer to the server computer.

The client/server implementation shown in FIG. 4 enables the storage at a single site of the Graphic, Background, FDFs and RPFs as well as the primary module 206 for use by a number of client computers 302. Thus, changes to the files 104, 105, 107, 109 and 206 may be made at a central location in an office environment rather than at each computer within the office. Other variations to the client/server implementation shown in FIG. 4 may be used to centralize the files used by the printing system while allowing each user at each client computer to interact with the printing system as if it resided on their client computer. The distribution of the files may also change with the primary module 206 residing on a different computer than the files 104, 105, 107 and 109, which may themselves reside on the same computer or different computers.

II. Generation, Customization and Printing of Forms

A. Screen Display and Interaction

Figure 5:
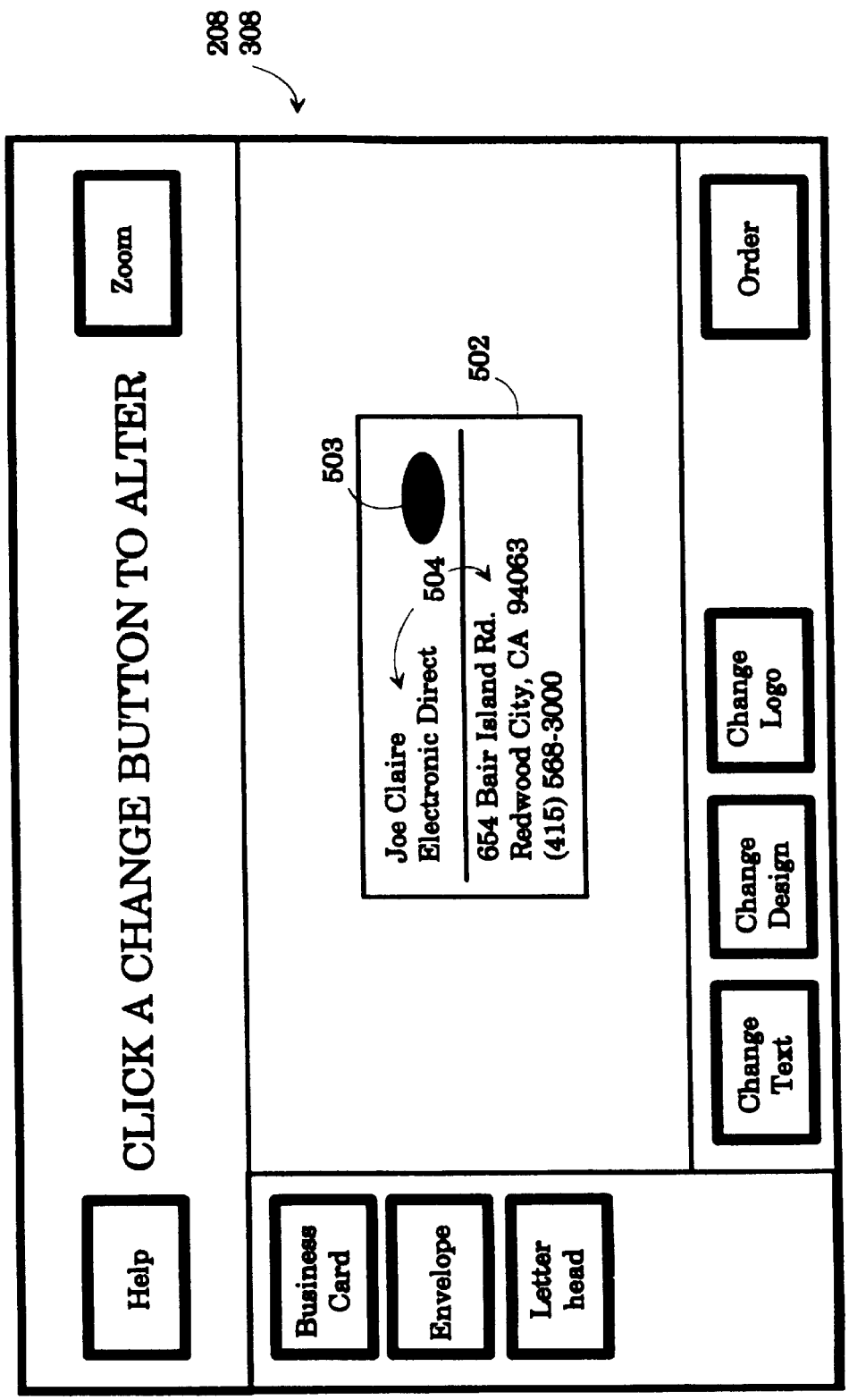
FIGS. 5 and 6 are schematic views of a typical screen generated by a preferred embodiment.
Figure 6:
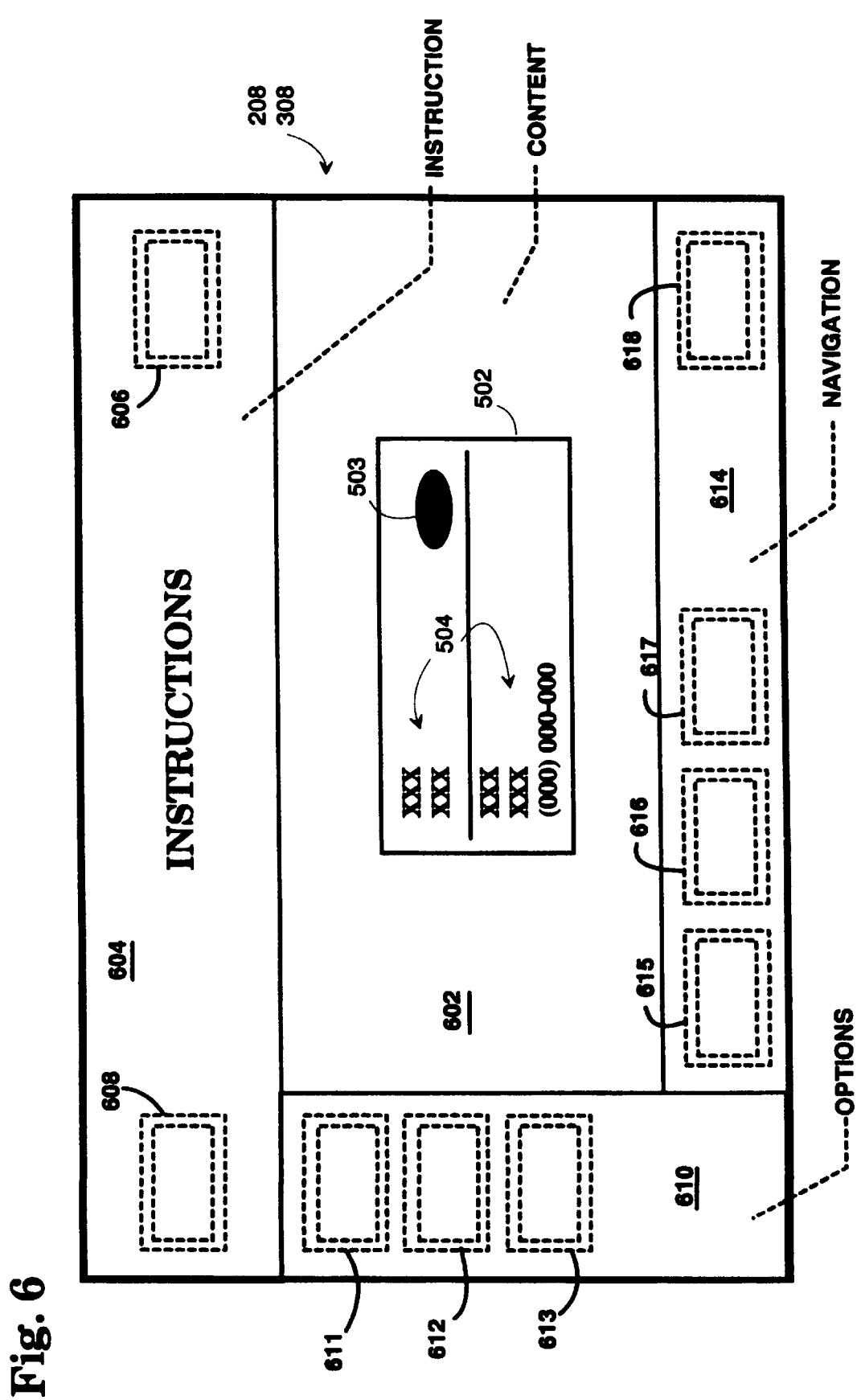

FIG. 5 of the drawings shows a typical screen generated by program module 206 during the creation of a printed product. As seen in FIG. 5, an electronic representation of a form, a business card 502 in this case, appears in a window in the center of display 208/308. "Buttons" appear in various panels on the screen, and the user touches the screen (kiosk) or clicks a mouse button (personal system) to indicate a selection. FIG. 6 of the drawings provides a schematic diagram of the panels contained on the screen shown in FIG. 5. Content panel 602 contains the representation of business card 502. Instruction panel 604 informs the user of the action required to be taken in that particular screen. As seen in FIG. 5, the user is provided with a representation of a business card 502 and is requested to "Click a Change Button To Alter" the card. Instruction panel 604 contains a "Zoom" button 606 to magnify the form (business card) displayed in content panel 602. Also contained in the instruction panel 604 is a "Help" button 608 which causes a help screen to be displayed to provide the user with on-screen help. Options panel 610 provides the user with a plurality of forms options 611–613 which in the case of FIG. 5 are seen to represent forms for business cards, envelopes and letterhead. Navigation panel 614 contains buttons 615–617 which allow for changes to the changeable features of the business card to be made. As seen in FIG. 5, the changeable features of the business card include the text, design and logo. The text is seen at 504 and includes the textual information printed on the card. The logo is seen at 503. The design of the card includes the placement of the text and of the logo. Button 618 allows the user to proceed with the next step, which in this case, as seen in FIG. 5 is the placement of a print order.

B. Form Selection and Modification

Figure 7:
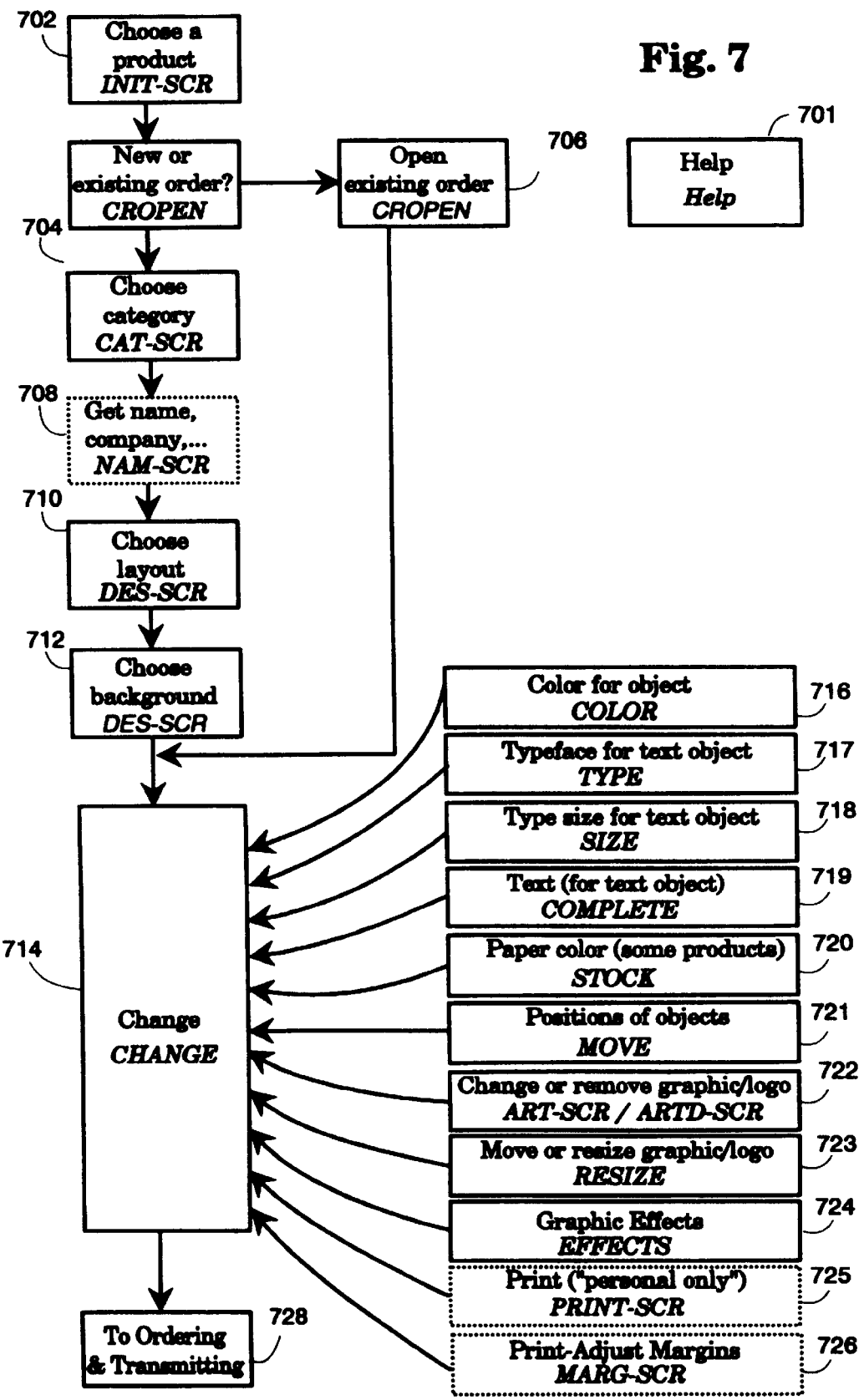
FIG. 7 is a block diagram showing element 114 of FIG. 1 in greater detail.
Figure 10:
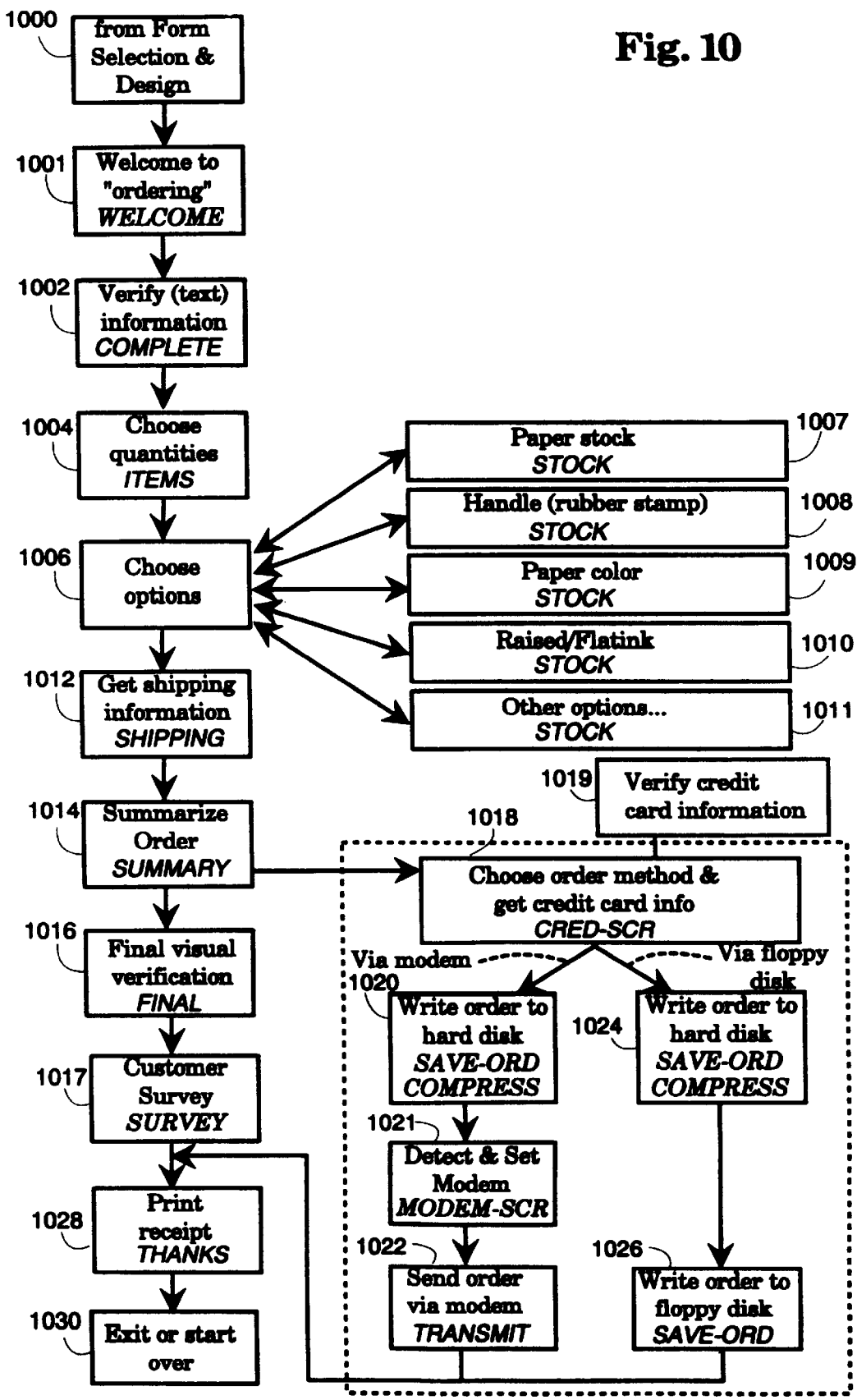
FIG. 10 is a block diagram showing element 116 of FIG. 1 in greater detail.

FIG. 7 of the drawings shows in greater detail the steps taken in the selection and modification of a form, seen initially at block 114 in FIG. 1. In FIG. 7, blocks with dotted lines indicate steps or functions performed by the personal system only, and blocks with solid lines indicate steps or functions performed by both the kiosk and the personal system. Block 701 represents a help button which is visible on each screen presented to the user to allow for rapid on-screen help. Blocks 702–714 represent a sequence of screens of the type seen and described in FIGS. 5 and 6. As seen at 702, the first step in selection of a form is the selection of a product. Products are defined by an FDF 105. Consequently the types of products available is dependent upon the FDFs resident in the storage of the printing system. Additional products may advantageously be loaded into the storage of a printing system as they become available or as they are required. Products currently available include business cards, letterhead, envelopes, rubber stamps, Post-It® brand note pads, padded office and home notes of other sorts, and invitations. Additional products which may be available by way of additional FDFs include embroidered or silk-screened shirts, caps, plaques and the like. Once a product is chosen, the user is prompted, as seen at 704, to either create a new order or to use an existing order. If a new order is selected, at steps 708–712, a category, layout and background of the product must be selected. In the personal system, the user name, address, and company information is obtained at step 708. Categories, layouts and backgrounds are described in further detail in the description accompanying FIG. 8. Typically, a category may include different physical configurations for the product. For instance, if a card product is chosen the categories for the card product may include business cards, calling cards and other different sizes of cards. In the event that an existing print order is desired to be used then at step 706 the user selects an existing order from among the existing orders displayed on the screen. The category, layout and background of the selected existing order will be used and steps 708–712 are skipped. Once the product, category, layout and background for the order have been selected, the user is presented with a change screen which allows the individual aspects seen at 716–726 of the selected product may be changed. Once each of the individual aspects seen at 716–726 has been selected, or left in the default value, then the generation of the print order and the transmission of the print order as initially seen at 116 in FIG. 1 may be performed. Once the user reaches the change screen 714, other products belonging to the same coordinated set of the selected product may be viewed and changed. Coordinated sets are product containing similar textual elements. The "Color for object" block 716 allows the changing of the ink color of individual objects or elements, or all objects and/or elements at once. This includes text and graphic (logo) objects, lines, rectangles and other types of objects and elements. The "Typeface for text object" block 717 allows the changing of the typeface of individual objects or elements or of all objects and/or elements. The "Type size for text object" block 718 allows the changing of the size of the type of individual objects or elements or of all objects and/or elements. The "Text" block 719 allows the changing of the content of the text of an element, thereby personalizing the element. The "Paper color" block 720 allows the changing of the paper which is to be used for certain products. For instance, where the product is a Post-It® brand type note several different paper types are available for selection. The "Positions of objects" block 721 allows the changing of the position of an object, within predefined limits on the form. The "Change or remove graphic/logo" block 722 allows the selection of a new logo, or the deletion of an existing logo on the layout. The "Move or resize graphic/logo" block 723 allows the changing of the position of a graphic/logo or the resizing (expansion or shrinkage) of the graphic/logo. The "Graphics Effects" block 724 allows the changing of certain aspects of graphics which are being used. The "Print" and "Print-Adjust Margins" blocks 725 and 726 are available only on the personal system and are used to, respectively, print the printed product locally, and to adjust the margins on the printed product. Once the changes available at block 714 have been made, the ordering and transmitting steps as shown in more detail in FIG. 10 are performed.

Initially, a user may choose to create a new order or to read in (and then modify) an existing order. Once a product type has been chosen (say business cards), there may be any number of categories of product to choose from (such as business cards or personal calling cards). Within a specific category, a number of different layouts are usually available. Each of the layouts is shown, preferably several to a screen, so that the user can choose a layout to work with (a desired layout). Each layout is described by a separate FDF. The FDFs are parsed by a parser.

C. Form Hierarchy

Figure 8:
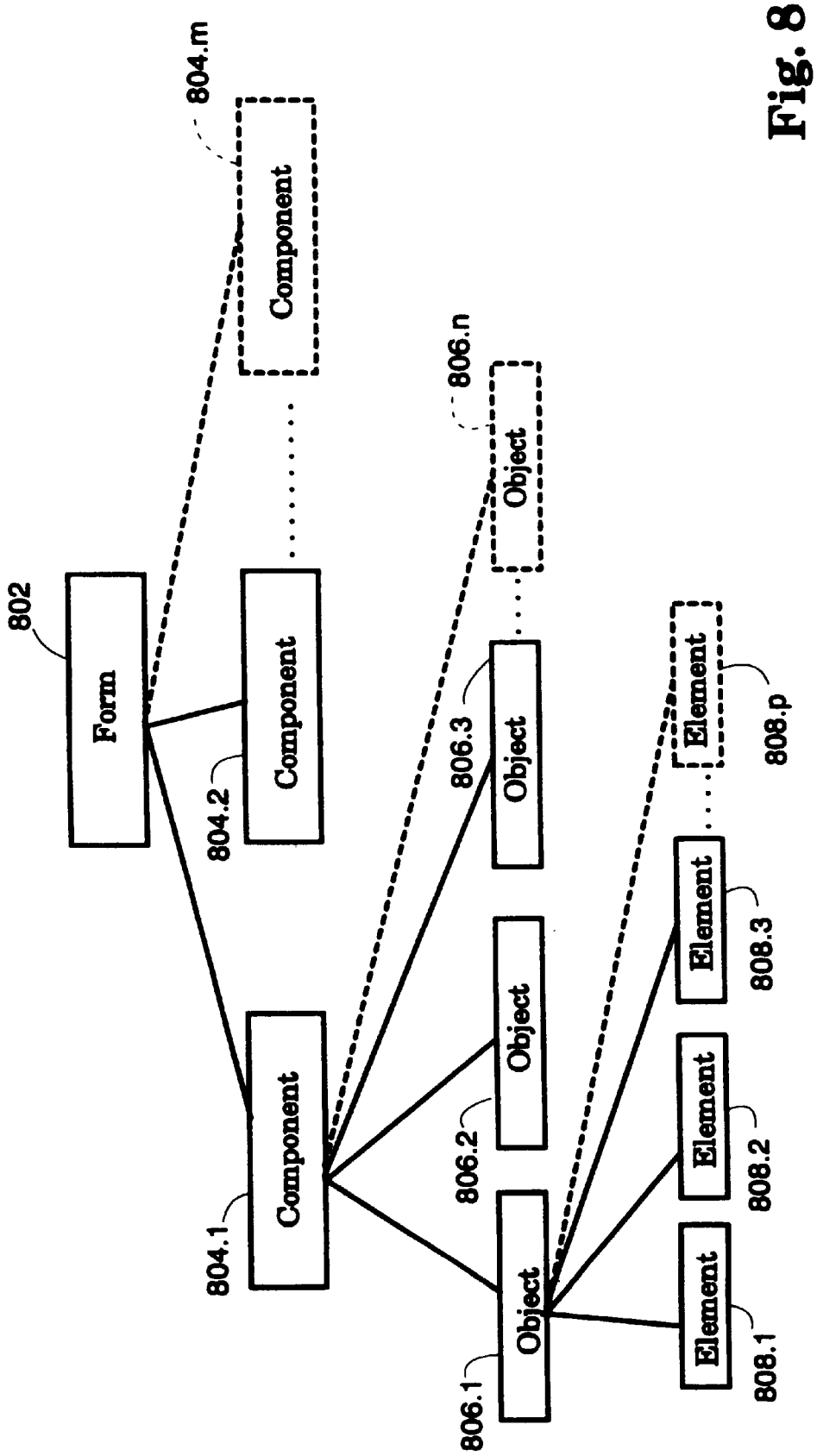
FIG. 8 is a block diagram showing element 105 of FIG. 1 in greater detail.

FIG. 8 of the drawings shows the hierarchy of forms implemented by the FDFs. The FDF contains a description of a form, composed of a hierarchical arrangement of pieces as seen in FIG. 8. A form 802 may include a number of components 804.1, 804.2 through 804.m, where m is an integer. Each of the components represents either (1) "layers" of the form, such as background and layout or (2) "faces" of the form such as cover, inside, back cover in the case of a multi-page form. Primary module 206 oversees the display of each of the components 804 on the screen and also the printing of each of the components. Primary module 206 also converts an FDF into a PostScript representation which can be written to a file and which may be printed by a PostScript type printer.

Each component 804 may contain a number of objects 806.1, 806.2 through 806.n, where n is an integer. Objects 806 typically represent "pieces" of the layout such as name, address and phone numbers in a business card form. Each object 806 may contain a number of elements 808.1, 808.2, 808.3 through 808.p, where p is an integer. Elements 808 are smaller pieces of an object, such as address-line-1, address-line-2, phone-voice, phone-fax, phone-pager in a business card form. Primary module 206 oversees the replacement of textual information in specific objects 806 or elements 808, in order to personalize the form 802 for the user. Primary module 206 also colorizes objects and elements to represent various inks (when printed) or fabrics, or other physical portions of the printed product. When the user personalizes objects or elements in such a manner, the changes are transmitted as part of the CXX file 117 which is sent to the remote printing facility 120. Such changes to the objects or elements have an exactly parallel effect on the EPS files 119 sent to the remote printing facility 120.

D. Layouts and Backgrounds

After a user has chosen a specific layout for a form, some products may also present a choice of paper background. As noted before, backgrounds may represent pre-printed papers ( on which the user may print directly when using the personal system), or backgrounds may themselves be printable. In either case, a background is represented by and FDF containing the information necessary to describe the background. FIGS. 9(a) and 9(b) are block diagrams showing the principal components of an FDF used to describe a layout and a background respectively. As seen in FIG. 9(a), the FDF 900 for a layout contains its information in first component 901 and contains no information in second component 902. As seen in FIG. 9(b), the FDF 906 for a background contains its information in second component 908 and no information in first component 907. A schematic representation of the information coded solely by the FDF 900 is shown in FIG. 9(c), and a schematic representation of the information coded solely by the FDF 906 is shown in FIG. 9(d). FIG. 9(e) shows a composite of the information coded by the FDFs 900 and 906 as the information would be displayed on the computer screen. As seen in FIG. 9(c), the FDF 900 contains code for textual and graphical images seen at 910 and 912 respectively. As seen in FIG. 9(d), the FDF 906 contains code for background image seen at 914. As seen in FIG. 9(e), the FDFs 900 and 906 cause images from both FDFs, namely, images 910, 912 and 914 to be displayed. The display seen in FIG. 9(e) occurs when the user has chosen both a layout and a background. Once this is accomplished, the FDFs are combined into a single form in the memory of the printing system 110. This form is displayed on the screen showing both the layout and the background. This combined form becomes the CXX file which describes part of the printing order and is also saved for later use on the computer. During printing, if the background is pre-printed on the printable media, the background FDF is ignored.

E. Ordering and Transmitting

FIG. 10 of the drawings shows in greater detail the steps taken in the ordering and transmission phases of the generation of a printed product which were seen initially at block 116 in FIG. 1. During the ordering and transmitting steps, the user selects which products will actually be ordered and what quantity of each product will be ordered. The user also enters information into the printing system required for the order to be placed with the remote printing facility 120. The ordering and transmitting steps are entered after completion of the form selection and design as described in the description accompanying FIG. 7. Upon entry into the ordering and transmitting portion of the printing system, the user is provided with a "Welcome" screen, as seen at 1001, and then at 1002 textual information (personalized information) which has been entered is verified. The user is then asked, as seen at 1004 to select the quantities of each orderable product which the user wishes to order. Next, at step 1006, a plurality of options, seen at 1007–1011, which are dependent upon the type of product to be ordered are provided. The user may select paper stock, the type of handle for a rubber stamp, the paper color, paper quality, paper weight, raised or flat ink, and other options particular to different types of products. At step 1012, shipping information is requested, which includes the name and address to which the printed product is to be shipped. At step 1016, a final visual verification of the print order is displayed. Upon confirmation by the user of the print order, by pressing of a button, ordering and transmitting process takes one of two routes depending on if the printing system being used is the kiosk or the personal system.

In the kiosk, step 1017 is performed after step 1016. At step 1016, the user is presented with a series of questions to answer in completing a survey as to certain aspects of the printing system. After completion of the survey, at 1028, a receipt of the print order is printed, and, if the printing system is the kiosk, then the user pays for the order elsewhere, at a cashier, in the retail store in which the kiosk is located. The print order is stored in the kiosk and the CXX, ODF and EPS files corresponding to the print order are preferably retrieved from the kiosk subsequently by a telephone connection established by the remote printing facility. An order release procedure is advantageously carried out on the kiosk to ensure payment for an order has been made before the print order is transmitted to the remote printing facility. Once the print order has been paid for by the customer at the cashier, an authorized individual, generally an employee of the store in which the kiosk is located, releases the print order, using an order number which uniquely identifies the print order. Once released, the order may be transmitted to the remote printing facility. At step 1030 the printing system resets to form selection and design for entry of a new order.

If the printing system is the personal system, then after the final visual verification at step 1016, the user is requested to choose an order method. Preferably, payment for print orders placed with the remote print facility from the personal system are made via credit card. The user enters the type of card to be used along with the credit card number and expiration date. Credit card authorization is preferably obtained via the printing facility which receives the user's credit card information in the print order and obtains the necessary authorization from an authorization facility. Alternatively, as seen credit card authorization may be done by the printing system 110 directly. In either event, the printing system advantageously performs a limited verification of the credit card information entered by the user. The account numbers of each type of credit card (MasterCard, Visa, American Express) begin with a certain range of numbers. The printing system advantageously checks the numbers entered by the user against the allowable ranges for the selected type of card. In addition, an expiration date subsequent to the date of use by the user of the printing system must be entered.

Concurrent with the entry of credit card information, the user selects an order method, in other words, a method to transmit the print order to the remote printing facility. The print order may either be transmitted via modem as seen at step 1022, or by storage to a magnetic floppy diskette as seen at step 1026, which is then sent to the remote printing facility. In either method of transmission, the print order is saved to the magnetic hard disk of the printing system in compressed form by first asking the user for a file name under which the print order is to be stored. If step 1026 is to be executed, then the user if prompted to enter a file name for the print order on the floppy disk. If step 1022 is to be executed then at step 1021 the user is provided with a variety of buttons which allow the selection and set-up of a modem to be used in transmission of the print order. In response to the user's entry of selections for the modem, or in response to default settings for the modem, the printing system at step 1021 detects and sets the modem for transmission of the print order. Upon transmission of the print order, or upon storage of the print order to a floppy diskette, the printing system requests at step 1028 if a printed receipt is desired and if so, then the receipt is printed at the local printer 312. The process is then exited, causing the printing system to query the user if the printing system is to be exited, or if a new order is desired to be created.

III. Description of Functional Modules

Figure 11:
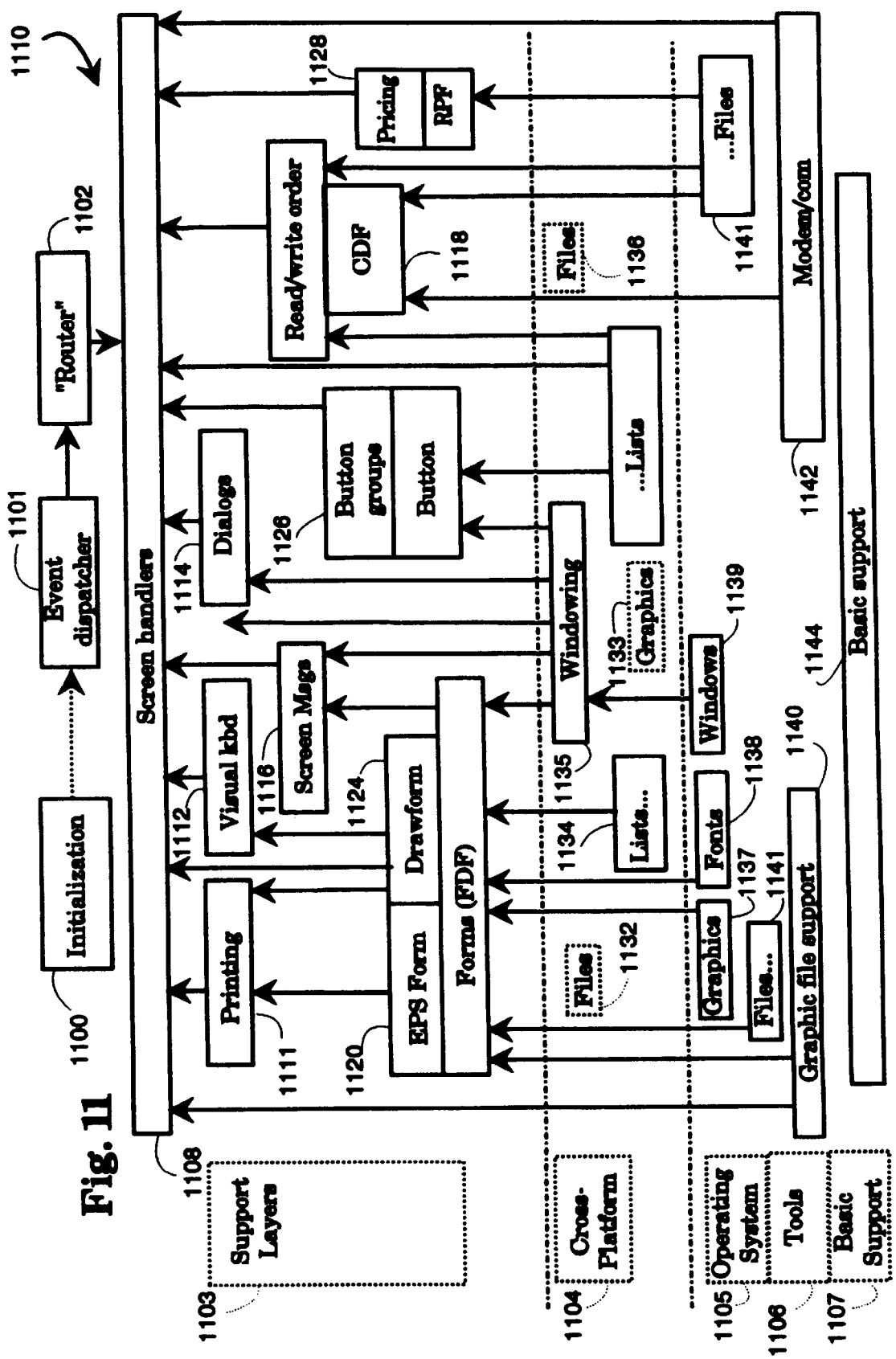
FIG. 11 is a block diagram of functional modules of a preferred printing system.

FIG. 11 is a block diagram showing the hierarchical organization of the program module 206. Principally, the program module 206 is comprised of a plurality of screen handlers 1108 and a plurality of support modules 1110 which implement functions at the request of the screen handlers 1108. The screen handlers 1108 perform functions, described previously, which control the user's flow through the printing system 110. Upon invocation of the printing system 110 by the user, initialization module 1100 performs initialization tasks, after which event dispatch module 1101 receives events occurring in the system and passes the received events to router module 1102 determines which screen handler 1108 should receive the event.

Because the printing system only displays a single screen at a time, there is only one screen handler in control at any given time. When that handler completes its task, it tells the router 1102 which screen should be displayed next, and the router handles the shutting down of the current screen handler and the switch to the next screen handler. As seen in FIG. 11, support modules 1110 are implemented in five layers: support layer 1103, cross-platform layer 1104, operating system layer 1105, third party tool layer 1106 and basic support layer 1107. Modules contained in support layer 1103 perform functions which provide major functionality to the screen handlers. Printing module 1111 is used when printing directly on the local printer in the personal system and when writing EPS type output files. The printing module 1110 is directly supported by the EPSForm and Drawform modules 1120 and 1124. EPSForm module 1120 produces PostScript type output directly to a file for subsequent transmission to the remote printing facility. Drawform module 1124 provides drawing functions which render images to either be printed on the printer or displayed on the screen, and it also supports the drawing of forms on the screen.

Forms module 1122 contains a parser which interprets FDFs and creates a corresponding structure in the computer's memory. These structures are then used directly by the EPSForm and DrawForm modules. The Visual kbd module 1112 provides the kiosk user with an on-screen rendering of a keyboard. The user may then touch the visual keys on the screen as if he or she were using a regular keyboard. As previously noted, the visual keyboard is driven from an FDF file. The Screen Msgs module 1116 provides windows which inform the user of actions the computer is taking such as "please wait", or which provide pricing and marketing information. Visually, on the screen, the information provided by Screen Msgs 1116 look like small pages from a notepad. The information provided by Screen Msgs, referred to as "screen messages" are parsed and created from FDF files and are drawn on the screen by Drawform module 1124.

Dialogs module 1114 is used by the printing system to alert a user to a situation, allow the user to make yes or no type choices, or when the printing system requires a simple one-line answer to a question. The printing system advantageously contains its own dialog manager which is built on components from the cross-platform layer 1104.

Button groups and button module 1126 provide "buttons" on the screen which may be "pressed" by the user. These buttons are built up as windows on the screen, supported by windowing capabilities in the cross-platform layer. Screen handlers create buttons on the screen as needed, react when the buttons are "pressed" and destroy the buttons when they are no longer needed.

The CDF module 1118 reads and writes order data. The CDF module 1118 stores all customer-related information other than the actual product forms themselves. The pricing module 1128 utilizes RPF support functions to parse pricing data which is maintained in memory during operation of the printing system. Pricing information is used during the ordering process and is written into the Order Data Files (ODF) when an order is completed.

The cross-platform layer 1104 contains modules which shield the screen handlers from what are otherwise basic operating system capabilities. For instance, standard File 1132, Graphic 1133, List management 1134 and Windowing functions 1135 are provided by the cross-platform layer. The cross-platform layer is preferably supported by the extensible Virtual Toolkit (XVT) available from XVT Software, Inc., Boulder, Colo. The operating system layer 1105 provides Graphics 1137, Fonts 1138, Windows 1139 and Files 1141 capabilities when native Application Program Interface (API) functions of the operating system are used.

The tools layer 1106 contains Graphic files support functions 1140 which read different types of graphic file formats and translate the files into an internal bit-mapped format which may be displayed or printed. The Graphic files support functions 1140 also perform image rotation, scaling, and gray-scale manipulations. The tools layer also contains Modem/com module 1142 which permits the printing system to connect to the computer's modem, dial the remote printing facility, negotiate a logical connection, and transmit files using the XMODEM or YMODEM file transfer protocols. The Graphic files support functions 1140 for implementation of the printing system on the Windows operating system are preferably of the type sold under the name LEADTools available from LEAD Technologies of Charlotte, S.C. The Modem/com module 1142 is preferably contained in the Greenleaf Communication Library available from Greenleaf Software, Inc. in Dallas, Tex.

The basic support layer 1107 contains basic support functions 1144 which are used by the screen handlers and the support layers. These functions provide memory allocation, color palette manipulation, maintenance of the main program window on the screen, text-paragraph manipulations and string handling for all English-language messages which are localized into the file Retail. Urn contained in the attached microfiche appendix.

As previously noted, in the section entitled "Brief Description of the Drawings" the italicized text in the attached drawings identifies the subroutine in the attached microfiche appendix which implements the step or elements associated with the subroutine in the drawing. For FIG. 11, the correspondence between the elements in FIG. 11 and the subroutines which implement the functions performed by those elements is provided below:

| Module Name, Reference Number | Subroutine(s) |
| --- | --- |
| Initialization, 1100 | INIT |
| Router, 1102 | ROUTER |
| Screen Handlers, 1108 | INIT-SCR, CROPEN, OPENSCR, CAT-SCR, NAM-SCR, DES-SCR, HELP, CHANGE, COLOR, TYPE, SIZE, COMPLETE, STOCK, MOVE, ART-SCR, ARTD-SCR, RESIZE, MARG-SCR, WELCOME, ITEMS, SHIPPING, SUMMARY, FINAL, CREDSCR, SAVE-ORD, COMPRESS, TRANSMIT, MODEMSCR, SURVEY, THANKS |
| Printing, 1110 | PRINTSCR, THANKS |
| Visual keyboard, 1112 | KEYBOARD |
| Dialogs, 1114 | BCXVT |
| Screen Msgs, 1116 | POSTITS |
| CDF, 1118 | CDF |
| EPS Form, 1120 | EPSFORM, DOWNLOAD, TIFF |
| Forms (FDF), 1122 | FORMS, PARSER |
| Drawform, 1124 | DRAWFORM |
| Button, 1126 | BUTTONS |
| Pricing, 1128 | PRICING, MATRIX |
| Lists, 1130 | SLIST, FIELDS |
| Graphic files support, 1140 | LEADTools |
| Modem/com, 1142 | TRANSMIT, GOLS |
| Basic support, 1144 | BCARD, BCGALLOC, DEPENDEN, MAINWIN PARAGRAP, STRSUPP, UTILS, RETAIL |

For implementation of the printing system on an IBM PC-compatible computer, the source code listed in the attached microfiche appendix is executable upon conversion into an executable module, when combined with the necessary supporting code, using an appropriate C/C++ compiler available from Borland International, Inc., Scotts Valley, Calif. 95066. For implementation of the printing system on a Macintosh computer available from Apple Computer Corporation, the source code listed in the attached microfiche appendix is executable upon conversion into an executable module, when combined with the necessary supporting code, using an appropriate C/C++ compiler available from Symantec Corporation, Cupertino, Calif. 95014. An alphabetical listing of each of the routines contained in the attached microfiche appendix is provided below. Most of the routines contained in the source code listing are implemented as a header file, which have a "xxx.h" type file name and a main file which have a "xxx.c" type file name. The listing of the routines provided below, and the identification of the routines in the drawings exclude the file type suffixes in the actual file names for the routines:

1. ART_SCR/ARTD_SCR
2. BCARD
3. BCFILE
4. BCGALLOC
5. BCXVT
6. BUTTONS
7. CAPS
8. CAT_SCR/DES_SCR
9. CDF
10. CHANGE
11. COMPLETE
12. COLOR
13. CREDSCR
14. CROPEN
15. COMPRESS/CRYPT
16. DEPENDEN
17. DES_SCR
18. DOWNLOAD
19. DRAWFORM
20. EPSFORM
21. FIELDS
22. FINAL
23. FORMS
24. HELP
25. INIT
26. INIT_SCR
27. ITEMS
28. KEYBOARD
29. MAINWIN

30. MARGSCR
31. MATRIX
32. MESSAGE
33. MODEMSCR
34. MOVE
35. NAM_SCR
36. OPENSCR
37. ORDER
38. PARAGRAP
39. PARSER
40. PRICING
41. POSTITS
42. PRINTSCR
43. RESIZE
44. RETAIL
45. ROUTER
46. SAVE_ORD
47. SENDIN
48. SHIPPING
49. SIZE
50. STOCK
51. STRSUPP
52. SUMMARY
53. SURVEY
54. THANKS
55. TIFF
56. TRANSMIT
57. TYPE
58. USERDATA
59. UTILS
60. WELCOME

The printing system described herein may advantageously be implemented by loading an executable version of the routines contained in the attached microfiche appendix in the storage of a suitable computer. The executable version may advantageously be distributed by a removable storage medium such as a magnetic floppy diskette, or alternatively may be electronically transmitted via a wide-area type network or by direct telephone connection.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A printing system for generating a print order which defines a printed product to be printed by a printing facility located remotely from the printing system, the printing system being operable on a computing system which includes a memory, a display, at least one input device, and a means for communicating with a remotely located printing facility, the printing system comprising:

product selection means for selecting a product from a plurality of predefined stored product definitions, in response to a product selection input from a user of the printing system;

means for defining a plurality of attribute layers from a corresponding plurality of predefined stored attributes classes, wherein each of the attribute layers is modifiable independent of remaining ones of the attribute layers;

means for generating a superimposed aggregation of the plurality of attribute layers to define the print order;

visual display means for providing a visual display of the printed product on the display in accordance with the print order; and print order transmission means for requesting selection of a print order transmission method from the user to transmit the print order, and for allowing transmission of the print order to the remotely located print facility and to the long-term storage depending on the print order transmission method selected, wherein the print order transmission means comprises means for transmitting the print order as a plurality of data files corresponding to the superimposed aggregation of the plurality of attribute layers.

2. The printing system as in claim 1, wherein the means for transmitting the print order comprises means for separately updating any of the plurality of data files corresponding to the plurality of attribute layers to allow a new print order to be placed based on a previously placed print order.

* * * * *

UNITED STATES PATENT AND TRADEMARK OFFICE
CERTIFICATE OF CORRECTION

PATENT NO. : 5,930,810
DATED : JULY 27, 1999
INVENTOR(S) : FARROS ET AL.

It is certified that error appears in the above-identified patent and that said Letters Patent is hereby corrected as shown below:

Col. 11, line 53: "if" should read --is--

Col. 12, line 13: insert --and-- after the numeral "1102"

Col. 13, line 42: "Urn" should read --Url--

Signed and Sealed this

First Day of May, 2001

*Attest:*

NICHOLAS P. GODICI

*Attesting Officer*     *Acting Director of the United States Patent and Trademark Office*